May 15, 1962  G. ZIEHM ET AL  3,035,265
ANTENNA COUPLING IN DIRECTION FINDING SYSTEMS
Filed Nov. 3, 1960  3 Sheets-Sheet 1

INVENTORS
Günther Ziehm &
Hermann Saur
BY George H. Spencer
ATTORNEY

May 15, 1962 G. ZIEHM ET AL 3,035,265
ANTENNA COUPLING IN DIRECTION FINDING SYSTEMS
Filed Nov. 3, 1960 3 Sheets-Sheet 3

INVENTOR
Günther Ziehm &
Hermann Saur

BY George H. Spencer
ATTORNEY

United States Patent Office 3,035,265
Patented May 15, 1962

3,035,265
ANTENNA COUPLING IN DIRECTION
FINDING SYSTEMS
Günther Ziehm and Hermann Saur, Ulm (Danube), Germany, assignors to Telefunken G.m.b.H., Berlin-Charlottenburg, Germany
Filed Nov. 3, 1960, Ser. No. 67,040
10 Claims. (Cl. 343—113)

The present invention relates to an antenna coupling and transmission-line circuit for obtaining an in-phase relationship between the voltage of a direction-finding antenna and the voltage of an auxiliary antenna also coupled to a direction finder in which the output voltages of the direction finding and auxiliary antennas are phase-shifted by 90°, the antennas being connected to the direction finding receiver by way of an electrically long cable and this in-phase relationship being used for obtaining a sense determination.

The problems incident to direction-finding systems having antennas coupled to the receiver by electrically long cables arise, for example, at high frequencies in every mobile direction finding system in which the antenna has to be mounted on the roof of a vehicle. The direction-finding antenna can, for example, be in the form of a crossed-coil antenna or a directional loop antenna. In the former case, two cables must be used for transmitting the direction-finding voltages to the receiver. In systems using a crossed-coil antenna, the receiver can operate on the goniometer principle or on the Watson-Watt principle. If such loop-type antenna or crossed-coil antenna with goniometer is used, a sense determination is obtained by means of an auxiliary antenna voltage which is in-phase with or opposed-phase with respect to the direction-finding voltage or voltages to produce a cardioid presentation. An auxiliary antenna voltage which is in-phase with or of opposed-phase with respect to the direction finding voltage is also used in a Watson-Watt direction finder for purposes of sense determination. In this latter case, the auxiliary antenna voltage is applied to the light intensity control electrode of an indicating tube, thereby causing portions of the trace of the tube to become blanked out.

It is known, however, that the voltage of the auxiliary antenna is phase-displaced by 90° relative to the voltage of the loop antenna. It is therefore necessary to provide an appropriate phase-shifting device for bringing the auxiliary antenna voltage and the direction finding voltage into the same phase or into opposed phase.

Heretofore, the above-mentioned in-phase or opposed-phase relationship has been obtained by tuning the loop antenna and/or the auxiliary antenna off resonance, whereby it then became a simple matter to use the phase shifts arising near resonance for obtaining the proper phase relationship. This solution, of course, is frequently not possible, or possible only with great difficulty, in a direction finding system in which the direction finding antenna is not attached directly to the receiver. To solve this problem, the prior art has resorted to the use of a tube circuit by which the auxiliary antenna voltage is fed to the receiver. This, however, resulted in prohibitive additional cost and complexity.

It is also known to insert an ohmic resistance in the auxiliary antenna circuit, but this has the disadvantage that only greatly attenuated voltages of the proper phase are obtained. Furthermore, the phase and amplitude of even so much of the voltage as remains is quite dependent on frequency.

It is, therefore, an object of the present invention to overcome the above disadvantages and, more particularly, to provide an arrangement for obtaining an in-phase or opposed-phase relationship between the direction finding voltage and the auxiliary antenna voltage.

It is another object of the present invention to provide an arrangement of the above type in which the in-phase or opposed-phase relationship is independent of frequency.

It is a further object of the present invention to provide an arrangement of the above type in which the ratio of the direction finding voltage to the auxiliary voltage amplitude is independent of frequency.

Additional objects and advantages of the present invention will become apparent upon consideration of the following description when taken in conjunction with the accompanying drawings, in which.

To obtain the above-mentioned objects according to the invention the impedances of the directional antenna and the auxiliary antenna are either by the construction of the antennas or by connecting lumped impedances to the impedances of the antennas so related that the total impedances are dual with respect to each other, i.e., they satisfy the equation $Z_1 Z_2 = Z_W^2$, wherein $Z_1$ is the total impedance of one antenna (together with eventually connected lumped impedances) $Z_2$ is the total impedance of the other antenna and $Z_W$ is the characteristic impedance of the attached cable.

As already said it is possible to construct the two antennas such that the impedances satisfy the above-mentioned equation. But also it is possible to connect to the impedances of the antennas such lumped impedances that the circuits are dual with respect to each other. According to a preferred example lumped elements are connected to the impedances of the antennas in such a manner that these elements complement the reactance of each antenna to form resonant circuits, these elements having such values and being connected to the antennas in such a manner that the resonant circuits are dual with respect to each other, i.e., they are so correlated as to satisfy the equation $Z_S/Y_P = Z_W^2$, wherein $Z_S (=Z_1)$ is an impedance of a series resonant circuit, $Y_P (=1/Z_2)$ is the admittance of a parallel resonant circuit and $Z_W$ is the characteristic impedance of the cable.

The following will show in case of the above-mentioned preferred example that the voltages of the auxiliary antenna and of the direction finding antenna will be in phase with each other at the output of the cable when the novel arrangement as disclosed herein is used.

Figure 1:
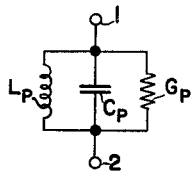
FIGURE 1 is a schematic representation of the equivalent circuit of a direction finding loop.

Let it be assumed that the direction finding antenna is a loop having a reactance $j\omega L_P$. According to the present invention, a capacitance $C_P$ and an admittance $G_P$ are connected in parallel with the reactance, the purpose of this admittance being for the subsequent calculation to take into account the ohmic or dissipative resistance of the loop. The parallel resonant circuit which is obtained is shown in FIGURE 1. The following voltage $V_1$ is obtained across the output terminals 1, 2 of the parallel resonant circuit:

$$V_1 = \frac{J_K}{Y_P} = \frac{J_K}{G_P(1+jQv)} \quad (1)$$

wherein $J_K = \frac{V_0}{j\omega L_P}$ = the short-circuit current, $Y_P$ = the total admittance of the parallel circuit,
$Q$ = the quality of the circuit,
$v$ = the detuning of the circuit,
$V_0 = j\omega F \mu_0 H$ = no-load or open-circuit voltage,
$F$ = the area of the loop,
$\mu_0$ = the permeability of vacuum,
$H$ = the magnetic field strength.

Figure 2:
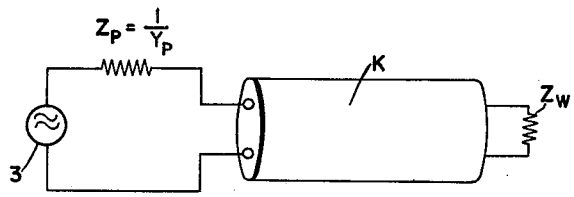
FIGURE 2 is a diagram showing the equivalent circuit of a loop antenna coupled to a long tranmission line terminated in its characteristic impedance.

The circuit shown at the left of FIGURE 2 is the equivalent circuit of the loop antenna having an inductance $L_P$ together with components $C_P$ and $G_P$ connected thereto, and a voltage source 3 producing the voltage $V_1$ and having an internal impedance $$Z_P = \frac{1}{Y_P}$$

This circuit is connected to an electrically long cable K, the other end of which has a terminating resistance equal to the characteristic impedance $Z_W$ of the cable. The voltage $V_2$ across the terminal resistance $Z_W$ is given by the formula:

$$V_2 = V_1 \frac{Z_W}{Z_W = \frac{1}{Y_P}} \quad (2)$$

Substituting for $V_1$ the value $$\frac{J_K}{Y_P}$$

then $$V_2 = J_K Z_W \frac{1}{Z_W Y_P + 1} \quad (3)$$

$J_K$ is independent of frequency, because $$J = \frac{V_0}{j\omega L} = \frac{j\omega F \mu_0 H}{j\omega L}$$

the same holds true for $Z_W$. It follows that in Equation 3 only the factor $$\frac{1}{Z_W Y_P + 1}$$

is dependent on frequency.

Figure 3:
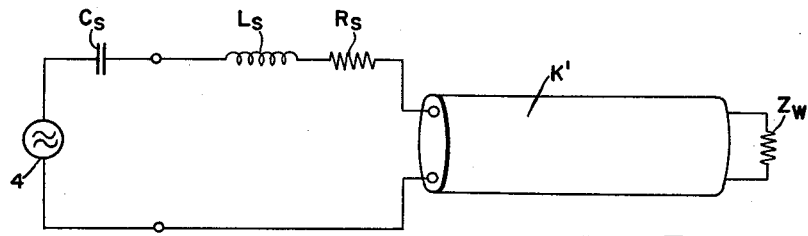
FIGURE 3 is a diagram showing the equivalent circuit of an auxiliary antenna coupled to a long transmission line terminated in its characteristic impedance.

The equivalent circuit of an auxiliary antenna, shown at the left of FIGURE 3, is represented by an ideal voltage source 4 and a capacitance $C_S$. According to the present invention, an inductance $L_S$ and a resistance $R_S$ are connected in series with the voltage source 4 and the capacitance $C_S$. This circuit is connected to a cable K' which is of the same length as the above-mentioned cable K, the cable K' likewise being connected to a terminating resistance $Z_W$. The voltage $V_3$ across the terminating resistance $Z_W$ is given by the formula:

$$V_3 = V_0 H \frac{1}{Z_W Z_S} = V_0 H \frac{1}{1+Z_S/Z_W} \quad (4)$$

wherein $V_0 H = E h_{eff} = Z_0 h_{eff} H$ = the no-load voltage.
$Z_S = R_S + j\left(\omega L_S - \frac{1}{\omega C_S}\right)$ = total impedance of the series circuit,
$Z_0$ = the characteristic impedance of air,
$h_{eff}$ = the effective height of the antenna,
$E$ = the electric field strength.

In Equation 4, only the factor $$\frac{1}{1+Z_S/Z_W}$$

is dependent on frequency.

The voltages $V_2$ and $V_3$ will be in phase, when the factor $$\frac{1}{Z_W Y_P + 1}$$

of Equation 3 is equal to the factor $$\frac{1}{1+Z_S/Z_W}$$

of Equation 4, i.e., when $$\frac{1}{Z_W Y_P + 1} = \frac{1}{1+Z_S/Z_W} \quad (5)$$

which will hold true when $$\frac{Z_S}{Y_P} = Z_W^2 \quad (6)$$

This, then, means that when the impedance $Z_S$ of the series resistance and the admittance $Y_P$ of the parallel circuit are such that their quotient is equal to the square of the characteristic impedance $Z_W$ of the cable, the direction finding antenna voltage and the auxiliary antenna voltage will be in phase at the end of the cable. Furthermore, the amplitude relationship of the two voltages will be independent of frequency. Thus if the antennas are used in a goniometer system or if only one directional loop antenna is used, the relationship between the voltages necessary to create the desired Lissajous pattern can be obtained by a single adjustment which will be satisfactory over a sizable frequency range.

The present invention can, of course, also be used when the cables connecting the antennas with the receiver are not very long, but the need for the advantages of the invention will then not be as great as where long cables are used.

Figure 4:
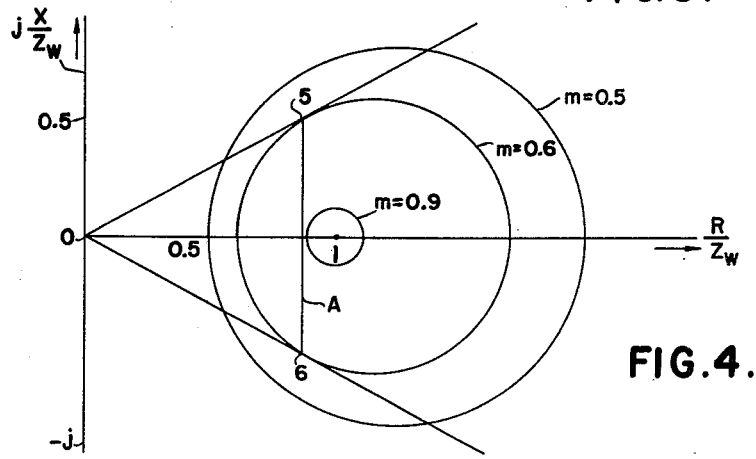
FIGURE 4 is a graphical illustration of the admittance circle diagram of the present antenna coupling circuit.

As explained above, the antennas are connected to the cables by additional lumped circuit components. In this way, no tube circuit is necessary for matching the antenna resistance to the characteristic impedance of the cable. It is true, however, that the circuit according to the present invention can not be used throughout unlimited frequency ranges, because the impedances of the resonant circuits vary with frequency so that a constantly changing impedance match is obtained, i.e., the circuit will become mismatched to the cable. It would be ideal if the characteristic impedance were the input impedance of the cable at all frequencies, i.e., for the parallel resonant circuit $Z_W$ would have to be equal to $1/Y_P$. But this can, of course, hold true only at the resonant frequency. It has been found, however, that a certain mismatching at the input of the cable can be tolerated. If, depending on the requirements, an allowable maximum standing wave ratio on the cable is selected, this will correspond to a particular so-called $m$-circle in the graph of the cable characteristics. The factor $m$ is defined as the ratio of the voltage minimum to the voltage maximum on the cable. It has been found that if $0.6 < m < 1$, the standing-wave ratio is still satisfactory. FIGURE 4 shows three so-called transmission circle diagrams in the imaginary plane, for the values $m=0.9$, $m=0.6$, and $m=0.5$. The magnitudes applied to the axes are numbers referred to the characteristic impedance, so that the axes represent only dimensionless numbers.

If now the series resonant circuit connected to the cable is considered, the series circuit comprising the auxiliary antenna together with the corresponding lumped circuit components according to the present invention, then the locus of the series circuit will be a vertical line parallel to the imaginary axis. According to a further development of the present invention, the real component of the series circuit is not made equal to $Z_W$, i.e., the locus of the series circuit will not be made to pass through the real axis at the value 1, instead, the locus will be as follows: from the origin at the imaginary axis lines are drawn tangent to the circle representing the permissible $m$. In the instant case, it is the circle where $m=0.6$. A vertical line A joining the points at which these tangents touch the circle, as well as an extension of this line beyond the tangent points, represents the locus of the series circuit which should be selected, and the real component of this series circuit is thus also determined.

Generally, the frequency range within which the system is to operate is fixed and predetermined, so that the limit frequencies $f_{min}$ and $f_{max}$ are known. The point 5 corresponds to the frequency $f_{max}$, $f_{min}$ being shown at the point 6. This, then, determines two reactances at the limit frequencies. In the instant example of FIGURE 4, the reactances are $-0.47Z_W$ and $+0.47Z_W$. From these values, together with the previously mentioned frequencies, an inductance and a capacitance can be calculated. Thus, the inductance $L_S$, and the parallel or series connected capacitance added to the antenna capacitance to form the capacitance $C_S$ can be made such that for each of the two frequencies the desired reactances are obtained.

Due to the duality or complementary nature of the circuits, the ohmic resistance determines the ohmic parallel resistance of the parallel circuit at the direction finding antenna. Similarly, it is possible to calculate the parallel capacitance and the requisite total inductance on the basis of the duality, or by following reasoning similar to that explained above in connection with the admittance diagram. The total inductance can be varied by parallel or series connecting inductances in addition to the antenna inductance.

The following will explain why, according to the present invention, the tangents are used on the diagram of FIGURE 4 to determine the locus of the circuits. The phase angle $\phi$ of the apparent resistance of a resonant circuit bears the following relation to the Q factor:

$$\phi = \arctan Qv \quad (7)$$

Equation 7 shows that for a predetermined maximum detuning $v$, at which the locus (a straight line representing the resistance) intersects the $m$-circle $m=0.6$, the particular resonant circuit which has the maximum Q will be that at which the phase angle reaches its maximum value. It will be seen that this will occur at the points 5 and 6, i.e., the points at which the tangents touch the circle.

According to the present invention, a particular value for the parallel resistance must be provided for the parallel circuit. This can be implemented as follows: It is known that ferrite-type antennas having a core of high permeability, that is to say, ferrite antennas with high flux concentrating effect, also have a relatively high ohmic resistance due to the ferrite. Inasmuch as the circuit according to the present invention requires a definite resistance, it is readily possible to use antennas having highly permeable cores, which, of course, is a very great practical advantage.

Thus, the circuitry according to the present invention maintains the in-phase or opposed-phase relationship between the direction finding and auxiliary antennas over a limited frequency range. The amplitude relationship of the two voltages is likewise rather insensitive to frequency changes. Furthermore, the present invention makes it possible to couple the antennas to electrically long cables without resorting to complicated circuits therefor.

But, as stated above, the antennas can, in practice, be matched to the cable only within a selected frequency range. If, then, the antenna is to be used for a wider frequency range, each antenna must be equipped with corresponding four-terminal networks, consisting of inductances, capacitances and resistances, which four-terminal networks are switched between the antennas and the cable for enabling the system to operate within the selected frequency range.

Figure 5:
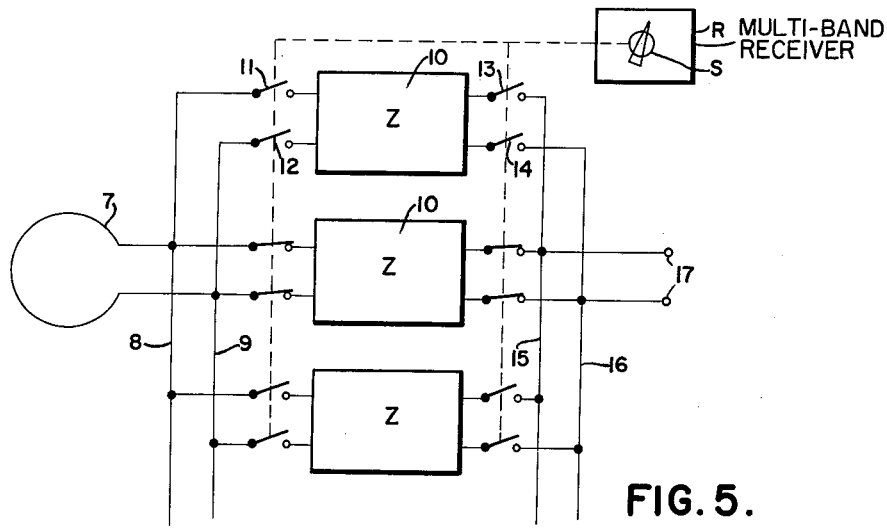
FIGURE 5 is a block diagram of an antenna coupling switching system for use with a multiband receiver.

All of the antenna circuits can be switched over simultaneously, and this can be effected, for example, at the same time as the frequency range of the receiver is switched. FIGURE 5 shows an arrangement which enables the radio direction finding system to be adapted for operation within any given frequency range. The antenna is shown as a loop 7 whose output terminals are connected to bus bars 8 and 9. The arrangement includes a plurality of four-terminal networks 10 each capable of supplementing the loop impedance so as to obtain the total impedance desired for the parallel circuit which is to be operated in a given frequency range. Each network 10 is connected to the bus bars 8 and 9 by appropriate switch means 11, 12, the output terminals of the networks 10 being connected to bus bars 15 and 16 by way of switches 13, 14. The output terminals 17 of the bus bars 15, 16 are connected to the cable (not shown in FIGURE 5). As stated above, the switches 11, 12 and 13, 14 can be actuated simultaneously with the band switch S of a multiband receiver R when the same is set for operation in a selected frequency range.

At the same time that the appropriate four-terminal network is interposed between the direction finding loop and the cable, an appropriate four-terminal network will be interposed between the auxiliary antenna and the corresponding cable, the operation being identical as described above. Any additional direction loop will similarly have an appropriate network switched between itself and its cable.

According to a further feature of the present invention, the switching over can be effected by so-called gas pressure relays. Such relays have the advantages that they are very small; that they do not appreciably affect the high frequencies which they conduct; and that they are easily controllable.

Figure 6:
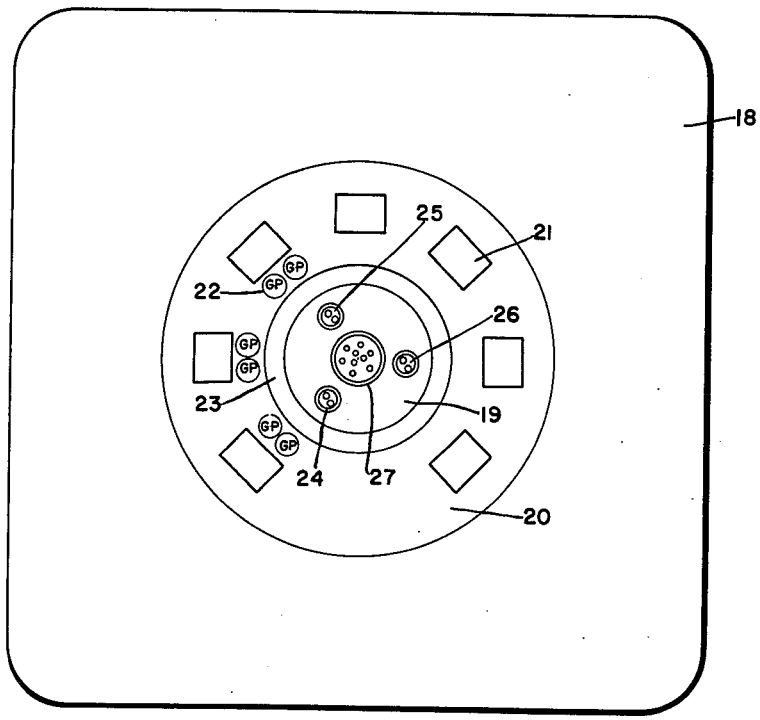
FIGURE 6 shows a view of a switching structure suitable for use with the present antenna coupling circuit.

FIGURE 6 shows the basic construction of an antenna coupling incorporating an arrangement according to the present invention. The antenna can, for example, be mounted on a motor vehicle or a ship. The antenna can be of a crossed-coil type (not shown) which is built into the housing 18. The auxiliary antenna is likewise not shown. In order better to illustrate the arrangement, FIGURE 6 is presented as a bottom view. The housing 18 is mounted on a conduit 19 through the interior of which the various connecting cables run. There are three flat plates made of insulating material, these flat plates being spaced by several centimeters in the direction of the axis of the conduit 19. Only the uppermost flat plate 20 is visible. Each of the flat plates carries four-terminal networks 21, and each of the antennas, in the instant case there being the two crossed loops and an auxiliary antenna, has one of the flat plates assigned to it. Consequently, it will suffice if but a single flat plate is described herein. Assume that the auxiliary antenna is assigned to the uppermost flat piece. This antenna is connected with bus bars (not shown). The gas pressure relays 22 are arranged between the four-terminal networks 21 and a ring 23, the surface of this ring carrying the bus bars. Neither the connections between the bus bars and the four-terminal networks nor the control circuit line for the gas pressure relays are shown in FIGURE 6. The other flat plates are similarly arranged. The corresponding cables are connected at sockets 25 and 26. The antenna voltage is coupled from the direction finding receiver (not shown) by way of the socket 27. If desired, an additional housing can be provided for protecting the flat plates carrying the four-terminal networks.

In a practical working embodiment of an antenna system according to the present invention, namely a system incorporating a crossed-coil antenna and an auxiliary antenna, ten frequency ranges were provided, i.e., for each antenna ten different four-terminal networks were provided. In this way, an overall frequency coverage of from 250 kilocycles to 30 megacycles was obtained.

Figure 7:
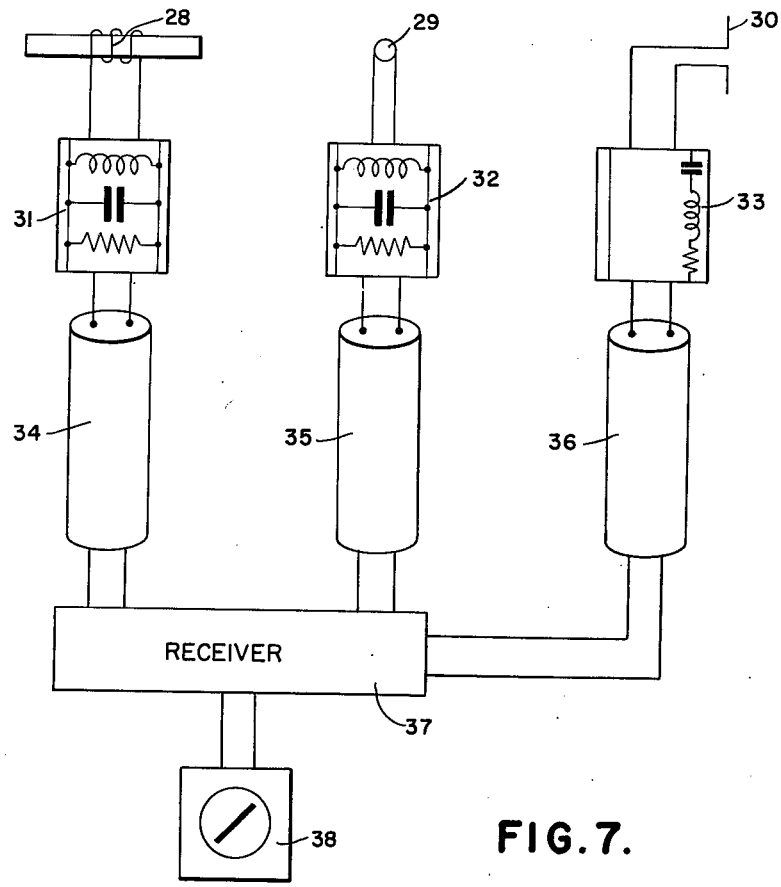
FIGURE 7 shows a complete block-diagram of a direction-finder using the arrangement according to the invention.

In FIG. 7 a complete direction finder containing the invention is represented schematically. The cross-coil antenna consisting of two coil antennas with ferromagnetic core is marked with the reference symbols 28 and 29. The auxiliary antenna 30 is represented as a dipole. According to the invention the impedance of the antennas 28 to 30 are complemented by lumped elements to form resonant circuits. The respective four-terminal networks are schematically represented by the blocks 31 to 33. The blocks 31 and 32 contain arrangements according to FIG. 5 and the block 33 contains a respective arrangement complementing the impedance of the dipole 30 to dual resonant circuit for the several frequency ranges. Between these blocks 31 to 33 and the direction finding receiver of the Watson Watt type 37 electrically long cables 34 to 36 are inserted. To the outputs of the receiver an indication tube 38 is connected.

By way of example the values of the impedances in one frequency range will be stated. The frequency range extends from 3.26 to 5.53 megacycles per second for which one four-terminal network is used on the antennas. The resonant frequency of the resonant circuit is 4.25 megacycles per second. The impedance of the coil antenna ($L_P$ in FIG. 1) is 5.05 microhenrys; the parallel connected condenser ($C_P$) has a capacity of 276 picofarads and the parallel connected resistance ($1/G_P$) has 136 ohms. The dipole used as auxiliary antenna ($C_S$ FIG. 3) has a capacity of 358 picofarads. With the dipole an inductivity ($L_S$) of 3.92 microhenrys and a resistance ($R_S$) of 105.5 ohms is connected in series. With these values of the impedances it is possible to work within the scope of the above-mentioned frequency range. The cables used in the arrangement have a characteristic impedance of 120 ohms.

Figure 8:
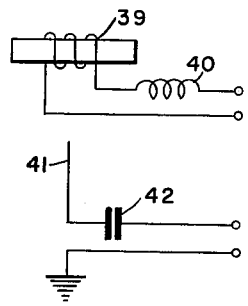
FIGURE 8 shows an other possibility for complementing the antennas' admittances to dual elements.

It will be understood that the above description of the present invention is susceptible to various modifications, changes and adaptations, and the same are intended to be comprehended within the meaning and range of equivalents of the appended claims. As already said it is possible to measure the auxiliary antenna and the coil antenna in such a way that the impedances are dual to each other. It is also possible to take two antennas, the impedances of which are not dual to each other and to connect in series or eventually parallel to the antennas' impedances such lumped impedances that the total impedances on the antennas are dual to each other. Such an example is represented in FIG. 8. With the impedance of the coil antenna 39 an inductance 40 is connected in series. The auxiliary antenna 41 is a dipole. With the impedance of this dipole a capacity 42 is connected in series and the inductance 40 and the capacity 42 are measured in such a way that the total impedances (the impedance of the antennas plus the impedance of the series-connected element) are dual to each other. It is also possible to connect several impedances to the antennas' impedances thus obtaining more complicated circuits, for example resonant circuits. To achieve the desired result it is according to the invention only necessary to connect and to measure the impedances in such a manner that the arising circuits at both antennas are dual in respect to each other and satisfy the given equation.

We claim:

1. In an antenna system including a directional antenna and an auxiliary antenna respectively having output voltages mutually displaced in phase by approximately 90°, coupling means for matching said antennas to a direction finding receiver and for shifting the relative phase of their voltages to a multiple of 180°, comprising electrically-long cable means coupled to the receiver and having a predetermined characteristic impedance; the impedances of the directional antenna and the auxiliary antenna being so related that the total impedances are dual with respect to each other, i.e., they satisfy the equation $Z_1 Z_2 = Z_W^2$, wherein $Z_1$ is the total impedance of one antenna, $Z_2$ is the total impedance of the other antenna and $Z_W$ is the characteristic impedance of the attached cable.

2. In an antenna system including a directional antenna and an auxiliary antenna respectively having output voltages mutually displaced in phase by approximately 90°, coupling means for matching said antennas to a direction finding receiver and for shifting the relative phase of their voltages to a multiple of 180°, comprising electrically-long cable means coupled to the receiver and having a predetermined characteristic impedance; a first network of lumped impedances coupling one of the antennas to the cable means; a second network of lumped impedances coupling the other antenna to the cable means, the first network when connected with said one antenna forming therewith a series resonant circit and the second network when connected with said other antenna forming therewith a parallel resonant circuit, and said series and parallel resonant circuits being so related that $$\frac{Z_S}{Y_P} = Z_W^2$$

where $Z_S(Z_1)$ is the impedance of the series circuit; $Y_P(1/Z_2)$ is the admittance of the parallel circuit; and $Z_W$ is the characteristic impedance of the cable means.

3. In a system as set forth in claim 2, said coupling means matching said antennas to the receiver substantially independent of frequency over a frequency range from a selected $f_{min}$ to $f_{max}$, wherein on an $m$-circle diagram of coordinates including an imaginary axis plotting $$j\frac{X}{Z_W}$$

and crossing at an origin point a real axis plotting $$\frac{R}{Z_W}$$

with a circle drawn about a center at unity on the real axis, the diameter of the circle representing the permissible standing wave ratio $v$ where $1 > v > 0$ and two lines drawn from the origin lie tangent with said circle, the resistance value in each network being equal to the value intersected on the real axis at which a line drawn between the two points of tangency crosses that axis, and the reactance values in each network equalling the points on the imaginary axis lying opposite said points of tangency.

4. The combination of at least two systems of coupling means as set forth in claim 2; a multiple range receiver; and switching means for simultaneously switching the frequency range of the receiver and selecting the corresponding system of coupling means for the antennas.

5. In the combination as set forth in claim 4, gas-pressure-operated relay means comprising said switching means between the networks and said antennas and cable means.

6. The combination of at least two systems of coupling means as set forth in claim 2; and switching means interposed between the systems of coupling means and the antennas and cable means for selecting the coupling means capable of matching the antennas to the receiver within a desired frequency range.

7. In the combination as set forth in claim 6, gas-pressure-operated relay means comprising said switching means between the networks and said antennas and cable means.

8. In a system as set forth in claim 2, said directional antenna is a crossed-coil antenna, and said antennas being mounted on a plate; plural insulating plates oriented in mutually-spaced stacked relation parallel with the mounting plate, each plate supporting networks adapted to match the antennas to the receiver over a range of frequencies; conduit means supporting said plates; high frequency coupling lines embedded in said conduit means; and relay means for selectively coupling the antennas to the receiver through the networks on one of said plates.

9. An antenna system as set forth in claim 1 wherein the total antenna impedance necessary for satisfying said equation is obtained by the antenna construction.

10. An antenna system as set forth in claim 1 wherein the total antenna impedance necessary for satisfying said equation is obtained by connecting lumped impedances to the impedances of the antennas, the total impedance of any one antenna thus including such lumped impedances as are connected to it.

References Cited in the file of this patent
UNITED STATES PATENTS 2,910,693  Kruesi _____ Oct. 27, 1959